US011008070B2

(12) United States Patent
Taylor

(10) Patent No.: US 11,008,070 B2
(45) Date of Patent: May 18, 2021

(54) MID-LINE TENSIONER

(71) Applicant: Flintstone Technology Ltd, Dundee (GB)

(72) Inventor: Richard Taylor, Dundee (GB)

(73) Assignee: FLINTSTONE TECHNOLOGY LTD, Dundee (GB)

( * ) Notice: Subject to any disclaimer, the term of this patent is extended or adjusted under 35 U.S.C. 154(b) by 0 days.

(21) Appl. No.: 16/606,744

(22) PCT Filed: Apr. 26, 2018

(86) PCT No.: PCT/GB2018/051104
§ 371 (c)(1),
(2) Date: Oct. 19, 2019

(87) PCT Pub. No.: WO2018/197883
PCT Pub. Date: Nov. 1, 2018

(65) Prior Publication Data
US 2020/0130783 A1 Apr. 30, 2020

(30) Foreign Application Priority Data
Apr. 27, 2017 (GB) ..................... 1706746

(51) Int. Cl.
*B63B 21/08* (2006.01)
*B63B 21/10* (2006.01)
(Continued)

(52) U.S. Cl.
CPC .............. *B63B 21/08* (2013.01); *B63B 21/10* (2013.01); *B63B 21/50* (2013.01); *F16G 15/04* (2013.01)

(58) Field of Classification Search
CPC ......... B63B 21/00; B63B 21/04; B63B 21/08; B63B 21/10; B63B 21/20; B63B 21/24; B63B 21/50; B63B 2021/505; F16G 15/04
(Continued)

(56) References Cited

U.S. PATENT DOCUMENTS

| 41,235 A | 1/1864 | Perkins | |
| 6,983,714 B2 * | 1/2006 | Dove | ...................... B63B 21/04 114/230.2 |
| 2002/0189522 A1 | 12/2002 | Dove et al. | |

FOREIGN PATENT DOCUMENTS

| EP | 0 081 258 A1 | 6/1983 |
| EP | 1 318 072 A2 | 6/2003 |
(Continued)

OTHER PUBLICATIONS

International Search Report and Written Opinion of the International Searching Authority, International Application No. PCT/GB2018/051104, dated Aug. 1, 2018, 9 pp.
(Continued)

*Primary Examiner* — Lars A Olson
(74) *Attorney, Agent, or Firm* — Myers Bigel, P.A.

(57) ABSTRACT

A mooring apparatus (50) comprising a guide portion (55) for guiding a portion of a first mooring line (60), an arrangement (65) for connecting or coupling the apparatus (50) to a second mooring line (70), and a lock (75) or lock means. The guide portion (55) is moveably connected to the arrangement, and the lock is connected to, attached to or provided on the arrangement. A system (250) for tensioning a mooring line, the system comprising the mooring apparatus (50) and the first mooring line (60) and/or the second mooring line (70). A method of tensioning a mooring line, wherein the method comprises providing the system for tensioning a mooring line, and the method further comprises
(Continued)

applying a pulling force to a first portion of a first mooring line (60) in a direction away from the apparatus (50).

19 Claims, 13 Drawing Sheets

(51) Int. Cl.
*B63B 21/50* (2006.01)
*F16G 15/04* (2006.01)

(58) Field of Classification Search
USPC .......................................... 114/230.22, 293
See application file for complete search history.

(56) References Cited

FOREIGN PATENT DOCUMENTS

| WO | 2013/004304 A2 | 1/2013 |
| WO | 2013/004749 A1 | 1/2013 |

OTHER PUBLICATIONS

International Preliminary Report on Patentability, International Application No. PCT/GB2018/051104, dated Oct. 29, 2019, 6 pp.

\* cited by examiner

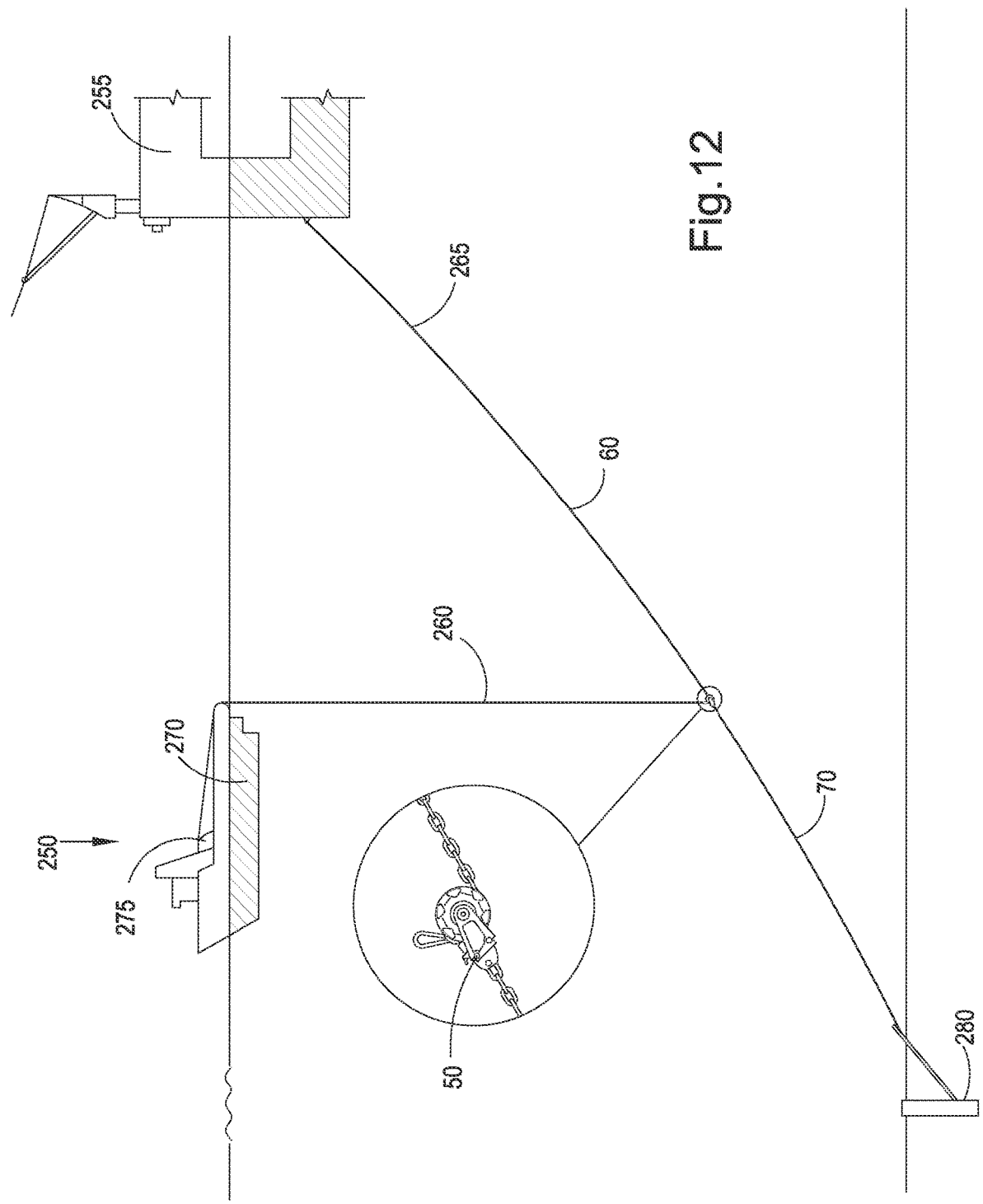

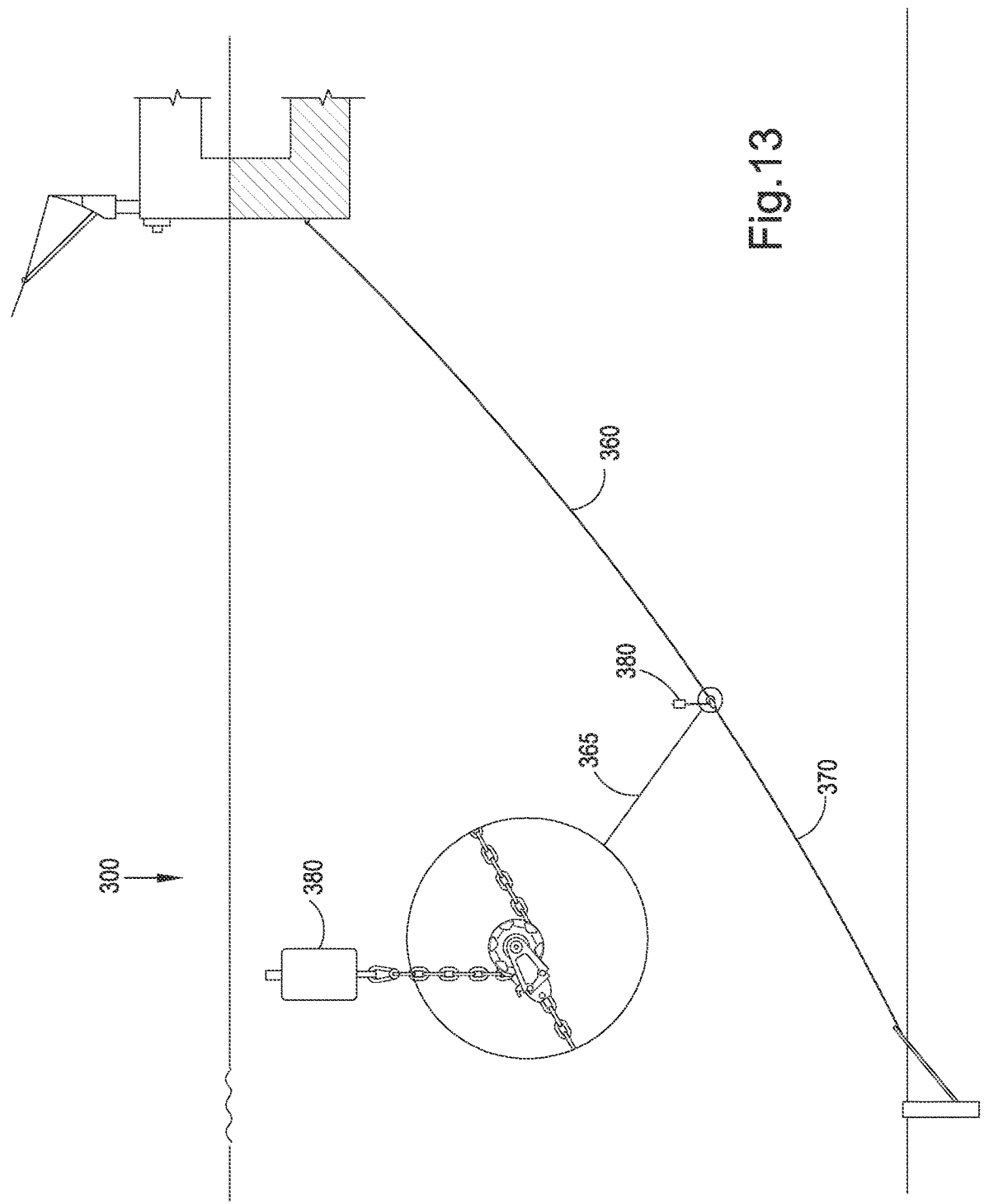

MID-LINE TENSIONER

RELATED APPLICATIONS

This application is a 35 U.S.C. § 371 national stage application of PCT Application No. PCT/GB2018/051104, filed on Apr. 26, 2018, which itself claims priority from Great Britain Patent Application No. 1706746.3, filed on Apr. 27, 2017, the contents of both of which are incorporated herein by reference in their entireties. The above-referenced PCT International Application was published in the English language as International Publication No. WO 2018/197883 A1 on Nov. 1, 2018.

FIELD OF INVENTION

This invention relates to an apparatus or device for tensioning a mooring line, a method of use of the apparatus or device, and a system for tensioning a mooring line. The mooring line may be a mooring line for a vessel or structure such as an off-shore or floating vessel or structure.

BACKGROUND TO INVENTION

Offshore structures, such as floating structures or platforms, can be moored by mooring lines, such as mooring chains. This may include attaching at least one mooring line to the structure to be moored and directly, or indirectly, coupling each mooring line to another structure, such as an anchor or pile located on the seabed.

A tension may be applied to each of the mooring lines. A necessary tension can be applied to each mooring line by, for example, the use of a tensioning apparatus. The tensioning apparatus may be adapted for use by a winch, or the like. The application of tension may serve to moor the floating structure or platform in a desired position.

When an appropriate tension has been applied to a mooring line, a locking mechanism may be locked to maintain the mooring line in tension. Similarly, when a tension has to be removed from the mooring line, for example, when movement of the floating structure or platform is desired, the locking mechanism may be unlocked.

The tensioning apparatus may be located on, or coupled to, the floating structure or platform. In such an arrangement, the mooring chain and/or tensioning apparatus may be prone to wear and/or failure due to out-of-plane stresses caused by movement of the floating structures or platforms relative to the mooring chain.

The tensioning apparatus may be located on, or coupled to, the mooring chain and may direct a free end or the mooring chain towards the surface to enable adjustment of the tension in the mooring line(s) e.g. by a winch located on a vessel.

During tensioning of the mooring line, bending strain can act on the mooring line due to the mooring line being pulled and/or bent around the tensioning apparatus. This can lead to increased wear and/or damage to the mooring chain and/or to the apparatus. In order to minimise the strain on the mooring line, the size of the tensioning apparatus may be increased to accommodate larger angles for guiding the mooring line towards the surface. However, this can lead to an increased cost and weight of the tensioning apparatus. Further, the increased weight of the tensioning apparatus also increases a loading upon the mooring chain, subsequently requiring an even greater tension to maintain a desired angle of inclination of the mooring chain.

It is an object of at least one embodiment of at least one aspect of the present invention to obviate or at least mitigate at least one problem in the prior art.

It is an object of at least one embodiment of at least one aspect of the present invention to provide a technically simple and/or commercially more cost effective apparatus and method for mooring than in the prior art.

SUMMARY OF INVENTION

According to a first aspect of the present invention there is provided a mooring apparatus. The apparatus may comprise a guide portion for guiding a portion of a first mooring line. The apparatus may comprise an arrangement for connecting or coupling the apparatus to a second mooring line. The apparatus may comprise a lock or lock means. The guide portion may be moveably connected to the arrangement. The lock may be connected to or provided on the arrangement.

By this apparatus a mooring line may be tensioned.

The apparatus may be known as a "Mid-Line Tensioner".

The lock or lock means may comprise a mooring line lock, e.g. capable of locking or retaining the first mooring line.

The lock may be disposed between the second mooring line and the guide portion and/or between the arrangement and the guide portion.

In use, at least a portion of the first mooring line may be disposed, locked and/or secured between the lock and the guide portion.

The lock may be adapted to secure and/or lock the first mooring line between the lock and an outer peripheral/circumferential portion of guide portion.

The arrangement may be rotatably connected to the guide portion, e.g. on or around an axis.

The lock may be hingedly or pivotally connected to the arrangement.

At least a portion of at least one or both of the mooring lines may be a chain, wire, rope, or the like. At least a portion of the first mooring line may be a first chain. At least a portion of the second mooring line may be a second chain.

The guide portion may be a wheel and/or may be substantially circular, such as mooring line wheel or a chain wheel which is rotatable relative to the arrangement, such as around a central axis of the guide portion. The guide portion may be a sprag wheel. The guide portion may be a sheave. The guide portion may be a toothed wheel, such as a cogwheel or the like.

In use, at least a portion of the first mooring line or at least one link of the first chain may be subject to a mooring tension, while the at least a portion of the first mooring line or the at least one link of the first chain is in contact with the guide portion or chain wheel. At least at least a portion of the first mooring line or at least one link of the first chain may be under a full mooring tension while the at least a portion of the first mooring line or the at least one link of the first chain is in contact with the chain wheel.

In use, at least a portion of the first mooring line may be in a position between the lock or lock means and the guide portion. In use, the at least a portion of the first mooring line may be subject to the mooring tension. In use, a portion of the first mooring line that is pulled through, threaded through, or wound around, the apparatus, or in contact with the guide portion or chain wheel and or the lock, may be under the mooring tension.

The guide portion may comprise a plurality of circumferentially arranged teeth, indentations, pockets, grooves, recesses, or the like. Each tooth, indentation, pocket, groove, recess, or the like, may be arranged to cooperate with at least a portion of the first mooring line, such as a link or links of the first chain. A dimension of each of the plurality of circumferentially arranged teeth, indentations, pockets, grooves, recesses, or the like, may be selected to correspond to a dimension of a portion of a mooring line. The dimension of each of the plurality of circumferentially arranged teeth, indentations, pockets, grooves, recesses, or the like, may be selected to correspond to a dimension of a link of the first chain.

The guide portion may be adapted to create the mooring tension in the first mooring line and/or the second mooring line by pulling at least one portion of the first mooring line towards the second mooring line.

In use, when the lock is in an engaged position, the guide portion may be subject to at least a portion of a mooring tension in the first mooring line.

The mooring tension may be greater than a tension caused by the weight of the mooring line itself and/or the weight of the apparatus on the mooring line and/or the influence of a surrounding environment upon the mooring line(s) or apparatus. The mooring tension may be greater than a self-induced tension.

The arrangement may comprise a plurality of parts. The arrangement may be arranged relative to or around at least a portion of the guide portion. The arrangement may be arranged symmetrically around the guide portion. In use, the arrangement may be detachably connected to the second mooring line. In use, the arrangement may be detachably connected to at least one link of the second chain. In use, the arrangement may be detachably connected to the second mooring line by means of a pin, such as a locking pin, a bolt, an elongate object, or the like.

The guide portion may be rotatably mounted on the arrangement. The guide portion may be rotatably mounted on the arrangement by means of an axle, a hub, a pin, a cylindrical element, or the like. The guide portion may be arranged to be movable around or about an axis of the apparatus.

The arrangement may comprise at least one stop-block, ridge, flange, protrusion, or the like, to limit a degree of movement of the lock.

The lock may be adapted to have a first position. The lock may be adapted to have a second position. The first position may be an engaged or lock position. The second position may be a disengaged position. The lock may be movable, actuable and/or operable between the first and/or second positions and vice versa.

In the engaged position, the lock may restrain a portion of the first mooring line. Beneficially, the provision of such a lock removes a need to maintain a mooring tension on at least a portion of the first mooring line. The portion of the first mooring line may be in contact with the guide portion. In the engaged position, the lock may abut at least one portion of the first mooring line.

The lock may be a mooring line stopper.
The lock may be a chain stopper.

In the engaged position, the lock or chain stopper may restrain at least a portion of the first mooring line or one link of the first chain. The at least a portion of the first mooring line or one link of the first chain may be in contact with the guide portion or chain wheel. In the engaged position, the lock or chain stopper may abut at least a portion of the first mooring line or at least one link of the first chain, wherein the at least a portion of the first mooring line or at least one link of the first chain is in contact with the guide portion or chain wheel.

In the engaged position, the lock may restrain the guide portion. In the engaged position, the lock may abut at least one portion of the guide portion.

The guide portion may comprise a plurality of circumferentially arranged teeth, indentations, castellations, or the like. The lock may be adapted to act upon and/or engage with, the at least a portion of the guide portion when the lock is in the engaged position.

The first chain and/or the second chain may be mooring chains. The first chain and/or the second chain may be a short link chain, a stud link chain, a twisted link chain, or the like. In use, a portion of the second chain may be connected to an anchor, a pile, such as a suction pile, a subsea structure, or the like. In use, the second chain may be connected to a subsea formation or floor of a body of water.

The lock may be adapted to be locked in the engaged position. The lock may be adapted to be locked in the engaged position by a locking pin. The lock may be adapted to be releasably locked in the disengaged position or the engaged position.

The lock may be adapted to be locked in the disengaged position. The lock may be adapted to be locked in the disengaged position by a locking pin.

The lock may comprise at least one hole. The locking pin may be removably insertable into the at least one hole. The arrangement may comprise at least one hole. The lock may be locked in a position by insertion of a locking pin through the at least one hole in the arrangement and/or the at least one hole in the lock.

The arrangement may comprise at least one shoulder, ridge or flange. The lock may be locked in a position by insertion of a locking pin through the at least one hole in the lock, wherein the locking pin may abut the at least one shoulder, ridge or flange of the arrangement.

Alternatively, the lock may comprise at least one shoulder, ridge or flange. The lock may be locked in a position by insertion of a locking pin through the at least one hole in the arrangement, wherein the locking pin may abut the at least one shoulder, ridge or flange of the lock.

The locking pin may be an elongate element or object. The locking pin may be a bolt, or the like.

The apparatus may comprise an arrangement, such as a lock positioning apparatus, for biasing the lock to an engaged position. The apparatus may comprise a lock positioning apparatus. The lock positioning apparatus may be adapted to move the lock between a disengaged position and an engaged position. The lock positioning apparatus may be adapted to move the lock from the disengaged position to the engaged position. The lock positioning apparatus may be adapted to predispose the lock to the engaged position. The lock positioning apparatus may be connected to the arrangement. The lock positioning apparatus may be hingedly or pivotably connected to the arrangement. The lock positioning apparatus may be connected to the lock. The lock positioning apparatus may be hingedly or pivotably connected to the arrangement and/or the lock. The lock positioning apparatus may be connected to the arrangement and/or the lock by an elongate element, such as a pin.

The lock positioning apparatus may comprise a spring, such as a coil spring or the like. The lock positioning apparatus may comprise a piston. The lock positioning apparatus may comprise a cylinder. The lock positioning apparatus may comprise an air spring. The lock may comprise a spring cylinder. The lock may comprise a damper or shock absorber.

The lock positioning apparatus may be configured to cause the lock to tend towards the engaged position.

The apparatus may be adapted to allow the first mooring line to be pulled through, threaded through, or wound around, the apparatus in a first direction. The apparatus may be adapted to inhibit movement of the first mooring line in a direction opposite to the first direction. The lock and/or the lock positioning apparatus may be adapted to allow the first mooring line to be pulled through, threaded through, or wound around, the apparatus in a first direction. The lock and/or the lock positioning apparatus may be adapted to inhibit movement of the first mooring line in a direction opposite to the first direction. The apparatus may be adapted to permit unidirectional movement of the mooring line around and/or through the apparatus.

The lock may be movable between the first and second positions by a mooring line as the mooring line is pulled through, threaded through, or wound around, the apparatus. The lock may be movable between the first and second positions by a mooring line as a mooring line is pulled or wound around the guide portion. The lock may be movable between the first and second positions by a mooring line as a mooring line is in contact with the guide portion, and the guide portion rotates around the axis.

The lock may be adapted to be predisposed to the engaged position. The lock may be adapted to pivot around an axis. The lock may comprise a mooring line engaging surface. The lock may be adapted to pivot between the disengaged position and the engaged position. In the engaged position the mooring line engaging surface may be adapted to act directly on at least a portion of the mooring line. In the engaged position the mooring line engaging surface may be adapted to act directly on at least a portion of the guide portion. In the disengaged position the mooring line engaging surface may be adapted to act directly on at least a portion of the first mooring line. In the engaged position, a mooring line engaging surface of the lock may be pivoted in a direction towards the guide portion. In the disengaged position, a mooring line engaging surface of the lock may be pivoted in a direction away from the guide portion. The mooring line engaging surface of the lock in a disengaged position may be in a location that is further from the guide portion than the mooring line engaging surface of the lock in an engaged position. The mooring line engaging surface may be adapted to conform to a shape of a portion of the mooring line. The mooring line engaging surface may comprise at least one seat. The at least one seat may conform to the shape of at least a portion of the first mooring line and/or the guide portion. In the engaged position the mooring line engaging surface may contact at least a portion of the mooring line at a plurality of points.

The lock or chain stopper may be adapted to be predisposed to the engaged position. The lock or chain stopper may be adapted to pivot around an axis. The lock or chain stopper may comprise a chain engaging surface. The lock or chain stopper may be adapted to pivot between a disengaged position and the engaged position. In the engaged position the chain engaging surface may be adapted to act directly on at least one link of the first chain. In the engaged position the chain engaging surface may be adapted to act directly on at least a portion of the chain wheel. In the disengaged position the chain engaging surface may be adapted to act directly on at least one link of the first chain. In the engaged position, a chain engaging surface of the lock or chain stopper may be pivoted in a direction towards the chain wheel. In the disengaged position, a chain engaging surface of the lock or chain stopper may be pivoted in a direction away from the chain wheel. The chain engaging surface of the lock or chain stopper in a disengaged position may be in a location that is further from the chain wheel than the chain engaging surface of the lock or chain stopper in an engaged position. The chain engaging surface may be adapted to conform to the shape of a link of the chain. The chain engaging surface may comprise at least one seat. The at least one seat may conform to the shape of at least a portion of a link of the chain. In the engaged position the chain engaging surface may contact a link of a chain at a plurality of points.

Movement of the first mooring line through the apparatus in a first direction may urge rotation of the guide portion in a first rotational direction. Movement of the first mooring line through the apparatus in a second direction may urge rotation of the guide portion in a second rotational direction. In use, the first mooring line may be engaged and/or meshed and/or interconnected with the guide portion. In use, at least one link of the first chain may be engaged with at least one tooth and/or at least one indentation, groove, pocket, recess, or the like of the chain wheel.

The apparatus may be submerged in use. The apparatus may be suitable for offshore and/or subsea/underwater operations. A length of the first mooring line extending from the apparatus to a floating structure may be sufficiently long such that, in use, the apparatus may be submerged. A length of the first mooring line extending from the apparatus to a floating structure may be sufficiently long such that, in use, a vessel may interact with the apparatus while remaining at a safe distance from the floating structure.

Beneficially, due to a mid-mooring line position of such an apparatus, a degree of out-of-plane bending applied to the apparatus may be reduced or sought to be minimised, in use. That is, in comparison to an apparatus wherein a mooring lie or chain stopper is positioned below a guide or chain wheel, leaving the mooring line or chain around the guide or chain wheel slack, and the entire apparatus is located in the proximity of a floating structure or vessel hull, the present invention is not subject to the relative motions that may be found between the mooring line and the structure/hull. Such relative motions may result in failure of the mooring line or mooring chain due to wear between a portion of the mooring line and the guide, or between chain links and wheel pockets. As such, the present invention does not require a locking mechanism located separately from the guide apparatus. Further, such an arrangement permits an implementation of a smaller, lighter and cheaper to manufacture and maintain solution. The provision of a smaller and/or lighter apparatus also minimises the tension applied to the mooring line by the apparatus itself.

Beneficially, the provision of a mooring line mounted apparatus for tensioning the mooring line, rather than an apparatus mounted on a vessel or anchor, provides mechanical advantage. That is, the mechanical advantage of the chain wheel, or sheave, may be used to apply a greater tension to the second mooring line. In use, this may be useful for pre-stretching mooring lines comprising at least in part a polymeric material, e.g. polyester, or the like. By pre-stretching the line, an amount of re-tensioning required over the life of the apparatus may be reduced.

The guide portion or chain wheel may comprise a plurality of circumferentially arranged cams.

The lock or chain stopper may comprise at least one finger or extension element. In use, the at least one extension element may be arranged to interact with the plurality of cams during rotation of the guide portion or chain wheel.

In use, as the guide portion or chain wheel rotates, each cam of the plurality of cams may be adapted to move the extension elements from a first position to a second position.

The transition of the at least one finger or extension element from the first position to the second position may cause the lock or chain stopper to transition from the engaged position to the disengaged position.

In use, the cams may be adapted to hold the lock or chain stopper in a disengaged position until the guide portion or chain wheel has rotated beyond a point where a restrained portion of the mooring line or a restrained chain link may be or become jammed by the lock or by the chain stopper.

Advantageously, such an arrangement prevents a "bitepoint" between the mooring line or chain and the lock or chain stopper occurring, preventing damage to the mooring line or chain, or to the apparatus.

According to a second aspect of the present invention, there is provided a system for tensioning a mooring line, the system comprising the mooring apparatus according to the first aspect.

The system may comprise a first mooring line. The system may comprise a second mooring line.

The system may comprise at least one structure, such as a floating structure, an offshore structure, a floating platform or the like.

A portion of the first mooring line may be threaded or threadable through the apparatus.

A first portion of the first mooring line may be configured to be connected or connectable to the structure.

The system may comprise a buoy. The system may comprise a floating vessel. The system may comprise a winch and/or a pulley. The winch and/or pulley may be located on or in the floating vessel. The buoy may be a submersible buoy, a semisubmersible buoy, a submerged turret production buoy, a submerged turret loading buoy or the like.

A second portion of the first mooring line may be configured to be connected to the buoy and/or the floating vessel and/or the winch and/or the pulley. The winch and/or pulley may be adapted to set, adjust or increase a tension in the first mooring line.

A first portion of the second mooring line may be connected to at least a portion of the apparatus. The first portion of the second mooring line may be connected to the arrangement. The first portion of the second mooring line may be releasably connected to the arrangement.

The system may comprise an anchor. The anchor may comprise an anchoring point. The anchor may be a pile, such as a suction pile or the like. The anchor may be a subsea formation. The anchor may be adapted for use on a seabed.

A second portion of the second mooring line may be connected to the anchor or to the anchoring point.

According to a third aspect of the present invention there is provided a method of tensioning a mooring line, wherein the method comprises:

providing a system for tensioning a mooring line according to the second aspect of the present invention, the method further comprises:

applying a pulling force to a first portion of a first mooring line in a direction away from the apparatus.

The pulling force may cause the apparatus to pull at least one other portion of the first mooring line towards a second mooring line.

The pulling force may cause the apparatus to pull at least one other portion of the first mooring line towards the apparatus.

When an appropriate or desired tension has been applied to the mooring line, the lock may be locked in the engaged position.

When an appropriate or desired tension has been applied to the mooring line, the first portion of the first mooring line may be attached to a buoy or the like.

When an appropriate tension has been applied to the mooring line, at least a portion of the first portion of the first mooring line may be cut away and/or removed and/or secured to the apparatus and/or secured to the first and/or second mooring lines.

According to a fourth aspect of the present invention there is provided a method for releasing tension in a mooring line, the method comprising:

providing a system for tensioning a mooring line according to the second aspect of the present invention, the method further comprising:

(a) applying a pulling force to the first portion of the first mooring line in a direction away from the apparatus;
(b) retaining the lock in the disengaged position; and
(c) reducing and or removing the pulling force.

The step of retaining the lock in the disengaged position may require removal and/or repositioning and/or insertion of at least one locking pin.

It should be understood that the features defined above in accordance with any aspect of the present invention or below relating to any specific embodiment of the invention may be utilised, either alone or in combination with any other defined feature, in any other aspect or embodiment or to form a further aspect or embodiment of the invention.

BRIEF DESCRIPTION OF DRAWINGS

These and other aspects of the present invention will now be described, by way of example only, with reference to the accompanying drawings, which are:

FIG. 11b a cross-sectional view of the embodiment of FIG. 11a;
FIG. 11c a top view of the embodiment of FIG. 11a;
FIG. 11d a perspective view of the embodiment of FIG. 11a;

FIG. 12 a diagram showing a first mooring system including a mooring apparatus of FIG. 2; and FIG. 13 a diagram showing a second mooring system including a mooring apparatus of FIG. 2.

DETAILED DESCRIPTION OF DRAWINGS

Figure 1A:
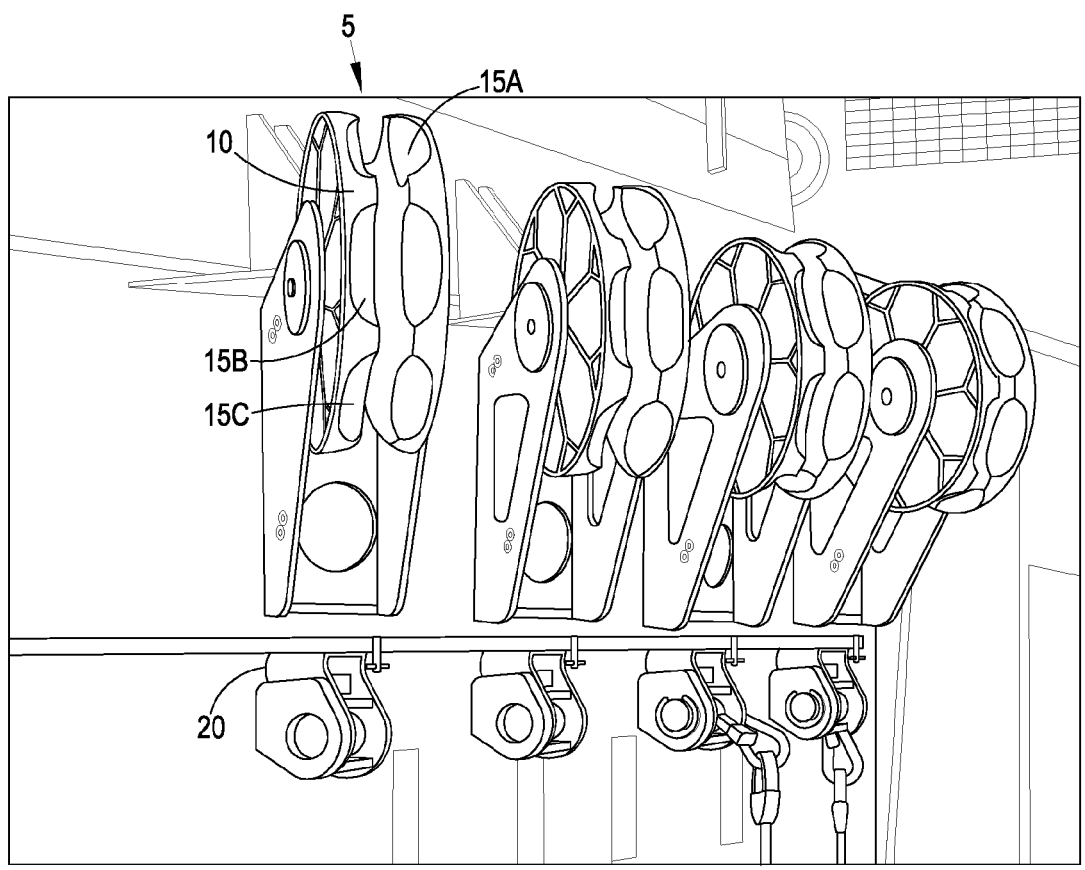
FIG. 1a an exemplary prior art apparatus.
Figure 1B:
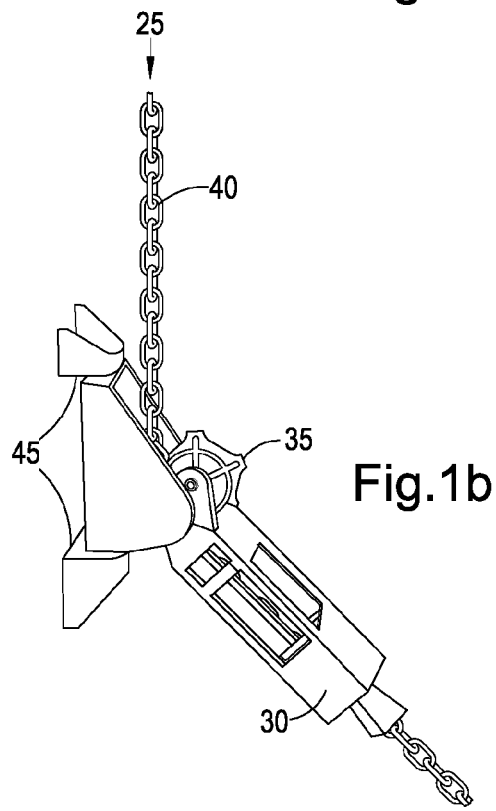
FIG. 1b an exemplary representation of a further prior art apparatus.

Referring firstly to FIGS. 1a and 1b of the accompanying drawings, there are shown two examples of prior art interfaces between a hull of a floating platform and a mooring line.

FIG. 1a shows an apparatus 5 wherein, in use, a mooring chain (not shown) remains in tension around a chain wheel 10. It is known that such an interface may result in failure of the mooring chain due to wear between the chain links of the mooring chain and wheel pockets 15a, 15b, 15c and out-of-plane bending stress in the chain links due to insufficient lever arm to rotate the pillar bearings 20.

FIG. 1b shows an exemplary representation of a further prior art apparatus 25. FIG. 1b shows a design of fairlead with a mooring chain stopper 30 located below a chain wheel 35. Such an arrangement leaves the mooring chain 40 around the chain wheel 35 slack. However, such an arrangement may also result in failure of the mooring chain 40 due to, at least, out-of-plane bending stresses in the chain links due to insufficient lever arm to rotate the pillar bearings 45. Further, such an arrangement is significantly large, heavy and expensive to manufacture, install and maintain.

In contrast, an apparatus located on the mooring line in a mid-water position is subject to none of the relative motions found at an interface between the hull of a floating platform and the mooring line. In an embodiment of the present invention, the chain links located on a mooring line tensioner are static relative to one another, as will now be described in more detail with reference to FIGS. 2 to 9.

Figure 2:
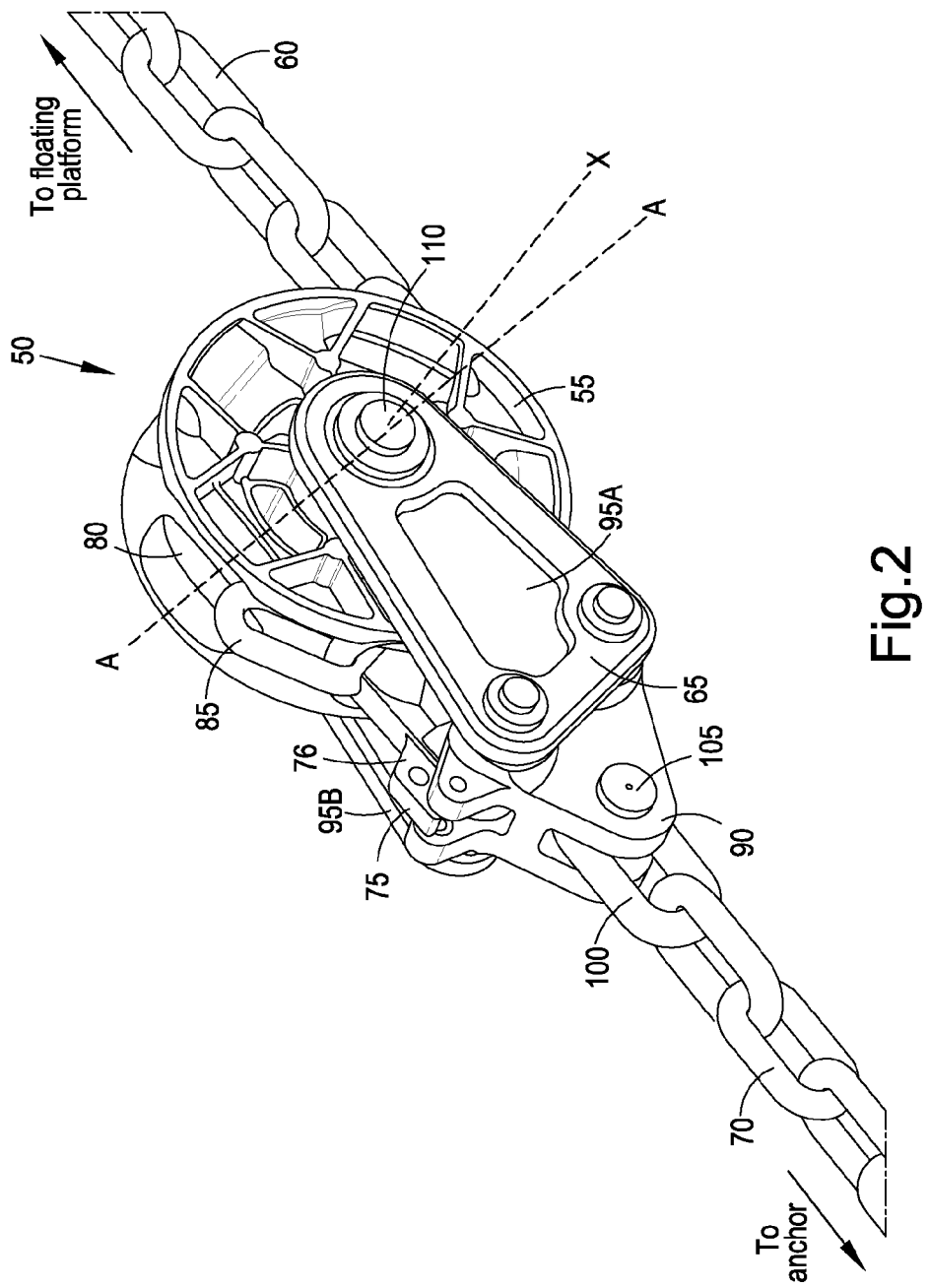
FIG. 2 a perspective view of a mooring apparatus according to a first embodiment of the present invention.

FIG. 2 shows a perspective view of a mooring apparatus, generally denoted 50, according to a first embodiment of the present invention. The mooring apparatus comprises a guide portion 55 for guiding a portion of a first mooring line 60. The apparatus also comprises an arrangement 65 for connecting or coupling the mooring apparatus 50 to a second mooring line 70. The mooring apparatus 50 also comprises a lock 75. The guide portion 55 is moveably connected to the arrangement 65, and the lock 75 also is connected to the arrangement 65. By this mooring apparatus 50, a mooring line (first mooring line 60) may be tensioned. One would appreciate that in other embodiments encompassing the inventive concept of the present invention, such an apparatus may be submerged in use. The apparatus is suitable for offshore and/or subsea operations.

Beneficially, due to a mid-mooring line position of such a mooring apparatus 50, a degree of out-of-plane bending stress applied to the mooring apparatus 50 is minimized in use. That is, in comparison to a prior art apparatus 25, wherein a chain stopper 30 is positioned below a chain wheel 35, leaving the chain 40 around the chain wheel 35 slack, and the entire apparatus 25 is located in the proximity of a floating structure or vessel hull, the present invention is not subject to the relative motions that may be found between the mooring line and the structure/hull. Such relative motions may result in failure of the mooring chain due to wear between chain links and wheel pockets. As such, the present invention does not require a locking mechanism located separately from the guide apparatus. Further, such an arrangement permits an implementation of a smaller, lighter and cheaper to manufacture and maintain solution. The provision of a smaller and/or lighter apparatus also minimises the tension applied to the mooring line by the apparatus itself.

In the embodiment shown in FIG. 2, at least a portion of the mooring lines 60, 70 is a chain. A portion of the first mooring line 60 is a first chain 60. At least a portion of the second mooring line 70 is a second chain 70.

The guide portion 55 is a wheel, e.g. chain wheel. The guide portion 55 comprises a plurality of circumferentially arranged pockets 80. A dimension of each of the plurality of circumferentially arranged pockets 80 is selected to correspond to a dimension of a link 85 of the first chain 60.

The guide portion 55 is adapted to create a mooring tension in a first mooring line 60 and/or a second mooring line 70 by pulling at least one portion of the first mooring 60 line, e.g. towards the second mooring line 70.

In use, when the lock 75 is in an engaged position, the guide portion 55 is subject to at least a portion of a mooring tension in the first mooring line 60. This differs from prior art mooring apparatuses, where typically the lock is subject to the full mooring tension.

The arrangement 65 comprises a plurality of parts 90, 95A, 95B. The arrangement 90, 95A, 95B is arranged around the guide portion 55. The arrangement 90, 95A, 95B is arranged symmetrically around the guide portion 55.

The arrangement 90 is detachably connected to the second mooring line 70. The arrangement 90 is detachably connected to one link 100 of the second chain 70 by means of a pin 105. One will appreciate that in other embodiments encompassing the inventive concept of the present invention, such a pin may be a locking pin, a bolt, an elongate object, or the like.

The guide portion 55 is rotatably mounted on the arrangement 95A, 95B by means of an axle 110. One will appreciate that in other embodiments encompassing the inventive concept of the present invention, the axle may be a hub, a pin, a cylindrical element, or the like. The guide portion 55 is arranged to be movable around or about an axis X of the apparatus 50.

Figure 3:
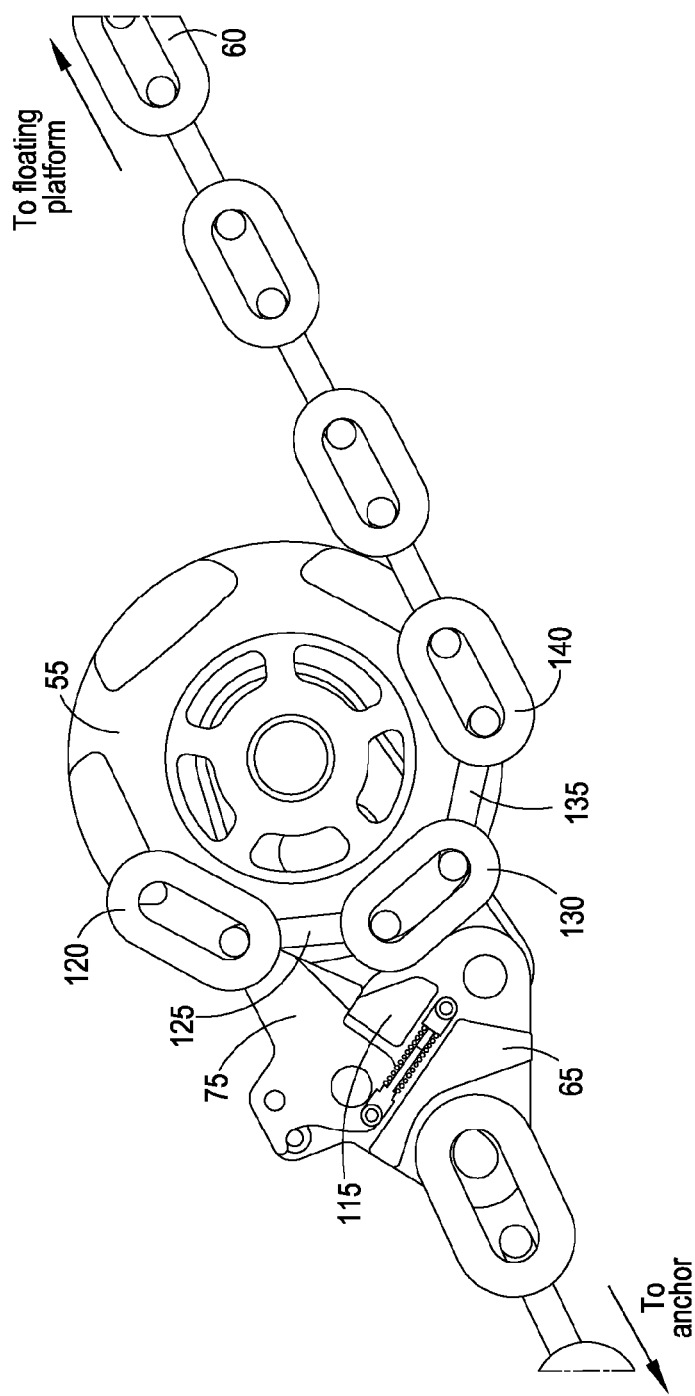
FIG. 3 a cross-sectional view of the apparatus of FIG. 2.

Referring now to FIG. 3, there is shown a cross-sectional view of the embodiment shown in FIG. 2. The arrangement 65 comprises a stop block 115 to limit a degree of movement of the lock 75.

The lock 75 is shown in a first, engaged position. The lock 75 may be movable, actuable and/or operable between the first position and a second position.

In the engaged position, the lock 75 restrains a portion 120 of the first mooring line 60. Beneficially, the provision of such a lock 75 removes a need to maintain a mooring tension on at least a portion 120 of the first mooring line 60. The portion 120 of the first mooring line 60 is in contact with the guide portion 55. In the engaged position, the lock 75 abuts the portion 120 of the first mooring line 60.

In the embodiment shown, the lock 75 is a chain stopper 76. One will appreciate that in alternative embodiments, the lock 75 may be a mooring line stopper.

In the engaged position, the chain stopper 76 restrains at least one link 120 of the first chain 60. The at least one link 120 of the first chain 60 is in contact with the chain wheel 55. In the engaged position, the chain stopper 76 abuts at least one link 120 of the first chain 60, wherein the at least one link 120 of the first chain 60 is in contact with the chain wheel 55.

In use, at least one link 120, 125, 130, 135, 140 of the first chain 60 is subject to the mooring tension, while the at least one link 120 of the first chain 60 is in contact with the chain wheel 55. One will appreciate that in other embodiments encompassing the inventive concept of the present invention, at least one link 120, 125, 130, 135, 140 of the first chain 60 may be under a full mooring tension while the link 120, 125, 130, 135, 140 of the first chain 60 is in contact with the chain wheel 55.

In the embodiment shown, the first chain 60 and/or the second chain 70 are mooring chains. One will appreciate that in other embodiments encompassing the inventive concept of the present invention, the first chain 60 and/or the second chain 70 may be a short link chain, a stud link chain, a twisted link chain, or the like. In use, a portion of the second chain 70 is connected to an anchor, a pile, such as a suction pile, a subsea structure, or the like, as will be described with reference to FIGS. 8 and 9.

Figure 4:
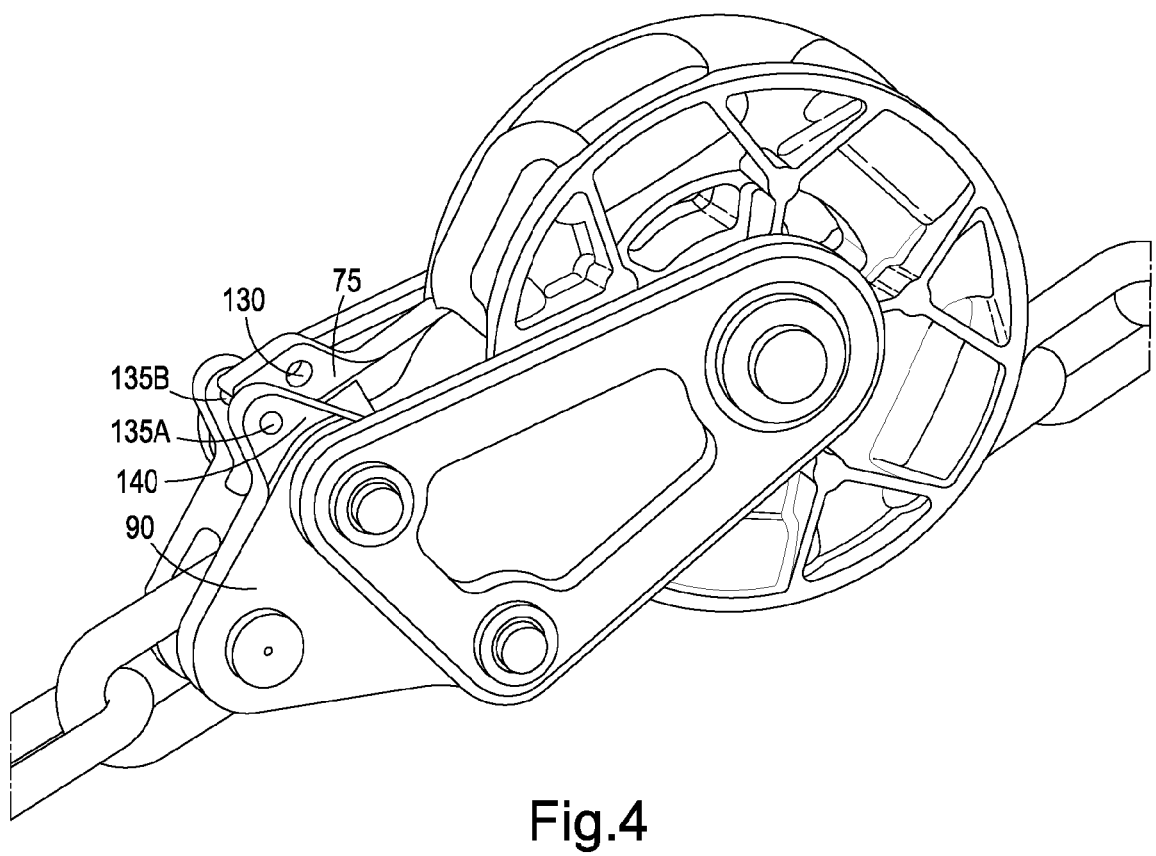
FIG. 4 a further perspective view of the apparatus of FIG. 2.

Referring now to FIG. 4, there is shown a further perspective view of the embodiment of FIG. 2. The lock 75 is adapted to be locked in the engaged position by a locking pin 82. The lock 75 is adapted to be releasably locked in the disengaged position or the engaged position.

Figure 8A:
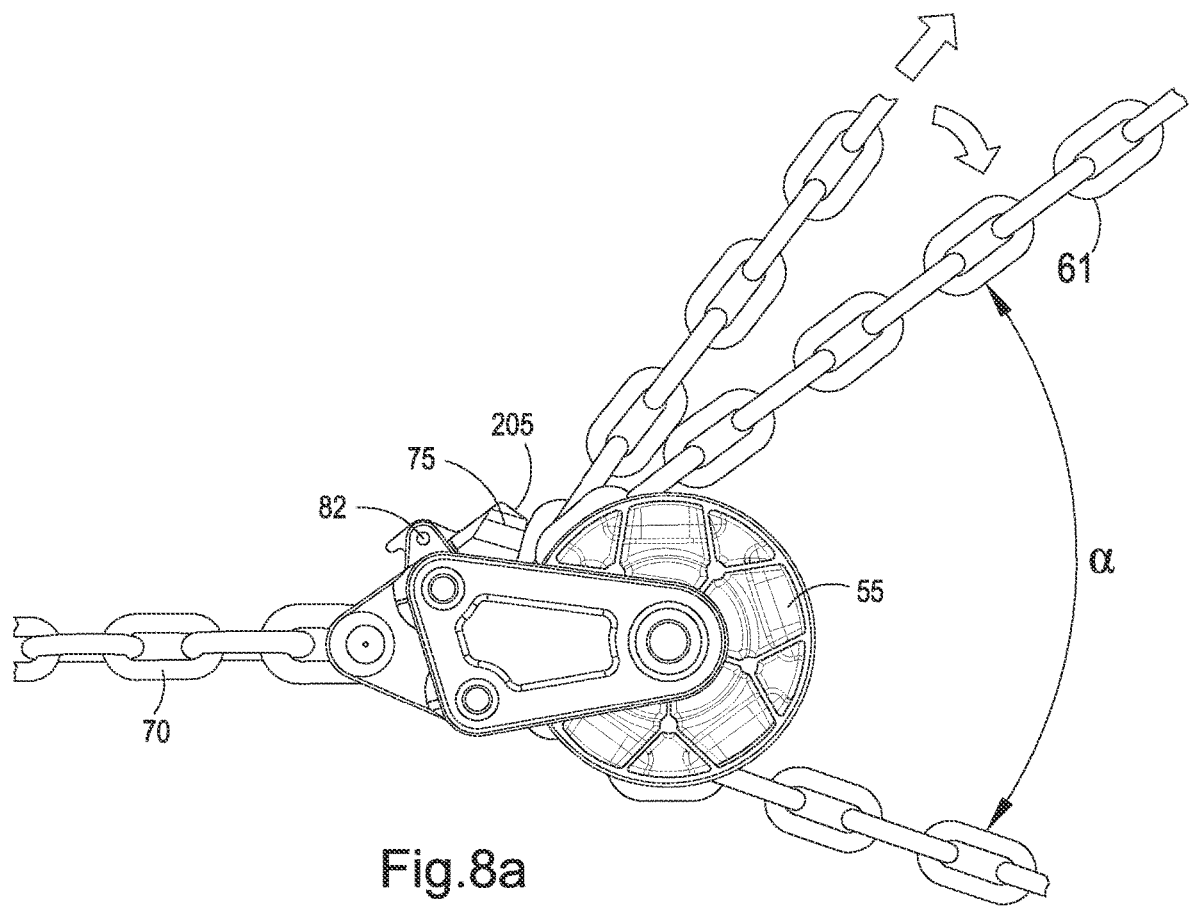
FIG. 8a a side view of the apparatus of FIG. 2.

The lock 75 is adapted to be locked in the disengaged position by a locking pin 82 (see locking pin 82, FIG. 8A).

The lock comprises a hole 130. The locking pin 82 may be inserted in the hole 130. The arrangement 90 comprises a plurality of holes 135A, 135B. The lock 75 can be locked in a position by insertion of a locking pin 82 through the at least one hole 135A, 135B in the arrangement 90 and/or the at least one hole 130 in the lock 75.

The arrangement 90 comprises a shoulder 140. The lock 75 can be locked in a position by insertion of a locking pin 82 through the hole 130 in the lock, wherein the pin abuts the shoulder 140 of the arrangement 90.

The locking pin is described below with reference to FIGS. 8a and 8b.

One will appreciate that in an alternative embodiment the lock 75 may comprise at least one shoulder, ridge or flange and the lock 75 may be locked in a position by insertion of a locking pin through the at least one hole 135A, 135B in the arrangement, wherein the pin may abut the at least one shoulder 140.

Figure 5:
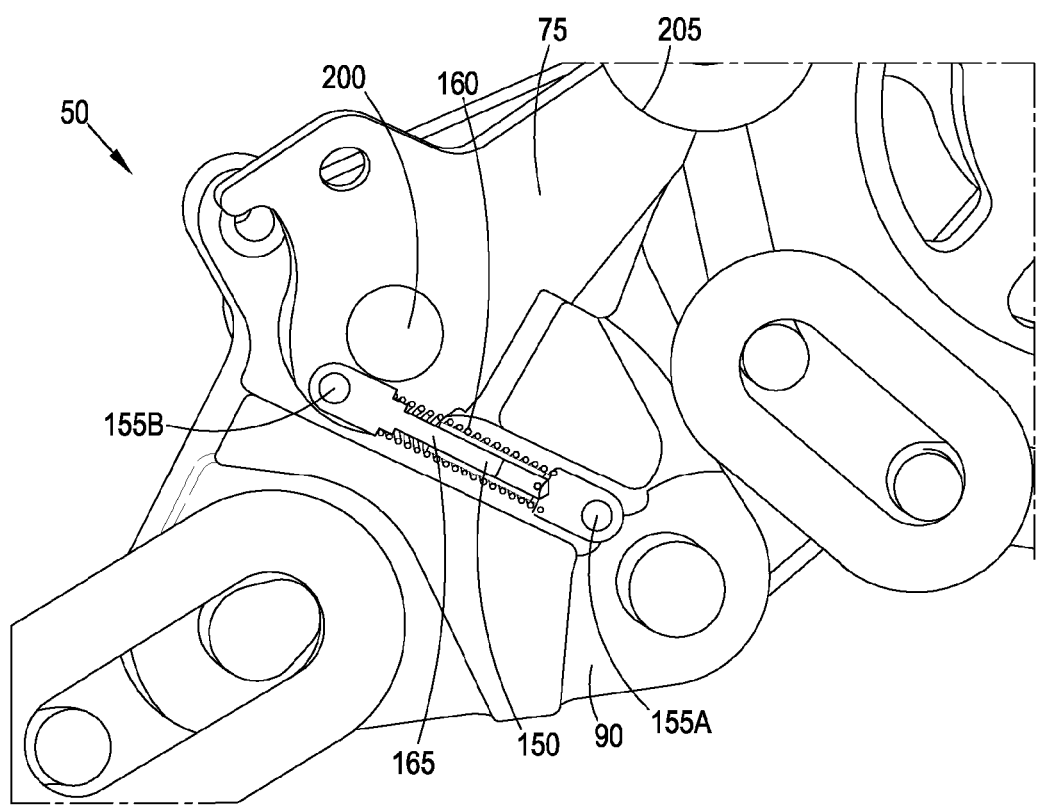
FIG. 5 a magnified portion of the cross-sectional view of the apparatus of FIG. 2.

Referring now to FIG. 5, there is shown a magnified portion of the cross-sectional view of the embodiment of FIG. 2. The apparatus 50 comprise a lock positioning apparatus 150. The lock positioning apparatus 150 is adapted to move the lock 75 between a disengaged position and an engaged position. The lock positioning apparatus 150 is adapted to move the lock 75 from the disengaged position to the engaged position. A shown in FIG. 5, the lock positioning apparatus 75 is adapted to predispose the lock 75 to the engaged position. The lock positioning apparatus 150 is pivotably connected to the arrangement 90 and the lock 75 by elongate elements 155A, 155B. One will appreciate that in other embodiments encompassing the inventive concept of the present invention, elongate elements 155A, 155B may be pins, axles, or the like.

The lock positioning apparatus 150 comprises a coil spring 160. The lock positioning apparatus 150 comprise spring cylinder 165. The lock positioning apparatus 150 is adapted to cause the lock 75 to tend towards the engaged position.

Figure 6:
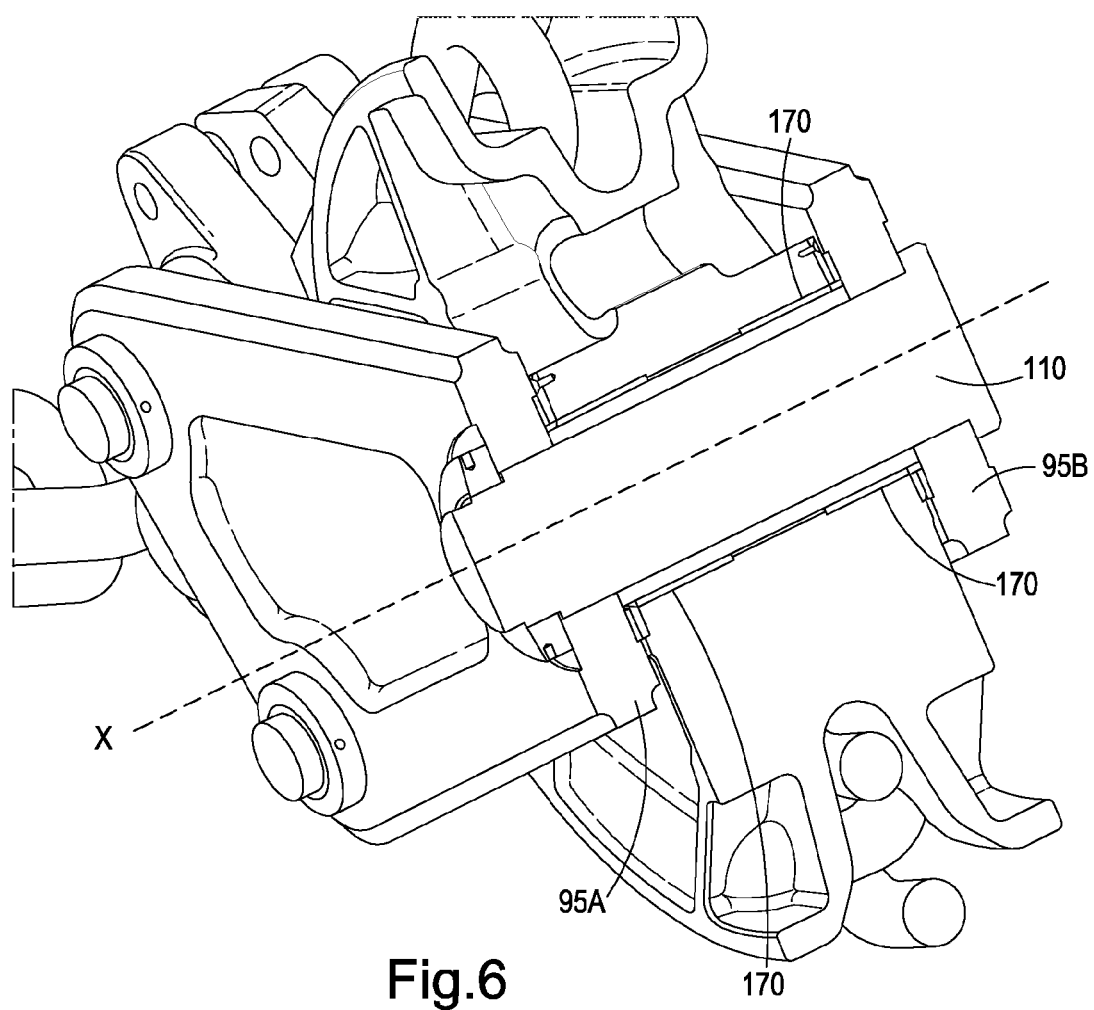
FIG. 6 a perspective view of a cross-section across line A-A of the apparatus of FIG. 2.

Referring now to FIG. 6, there is shown a perspective view of a cross-section across line A-A of the apparatus of FIG. 2. The guide portion 55 is rotatably mounted on the arrangement 95A, 95B by means of an axle 110. One will appreciate that in other embodiments encompassing the inventive concept of the present invention, the axle may be a hub, a pin, a cylindrical element, or the like. The guide portion 55 is arranged to be moveable around or about an axis X of the apparatus. The guide portion 55 rotates freely around axis X on bearings, such as maintenance free composite bearings 170.

The lock 75 is adapted to pivot around an axis 200. The lock 75 comprises a mooring line engaging surface 205. The lock 75 is adapted to pivot between the disengaged position and the engaged position. In the engaged position the mooring line engaging surface 205 is adapted to act directly on at least a portion of the mooring line 120. One will appreciate that in other embodiments encompassing the inventive concept of the present invention, in the engaged position the mooring line engaging surface 205 is adapted to act directly on at least a portion of the guide portion 55.

In the engaged position, a mooring line engaging surface 205 of the lock 75 is pivoted in a direction towards the guide portion 55. In the disengaged position, the mooring line engaging surface 205 of the lock 205 is pivoted in a direction away from the guide portion 55. The disengaged position is described in more detail below with reference to FIGS. 8a and 8b.

It can be seen from FIG. 5 that the mooring line engaging surface 205 is adapted to conform to a shape of a portion of the mooring line 120. The mooring line engaging surface 205 comprises a seat. The seat conforms to the shape of a portion of the first mooring line 60.

Figure 7:
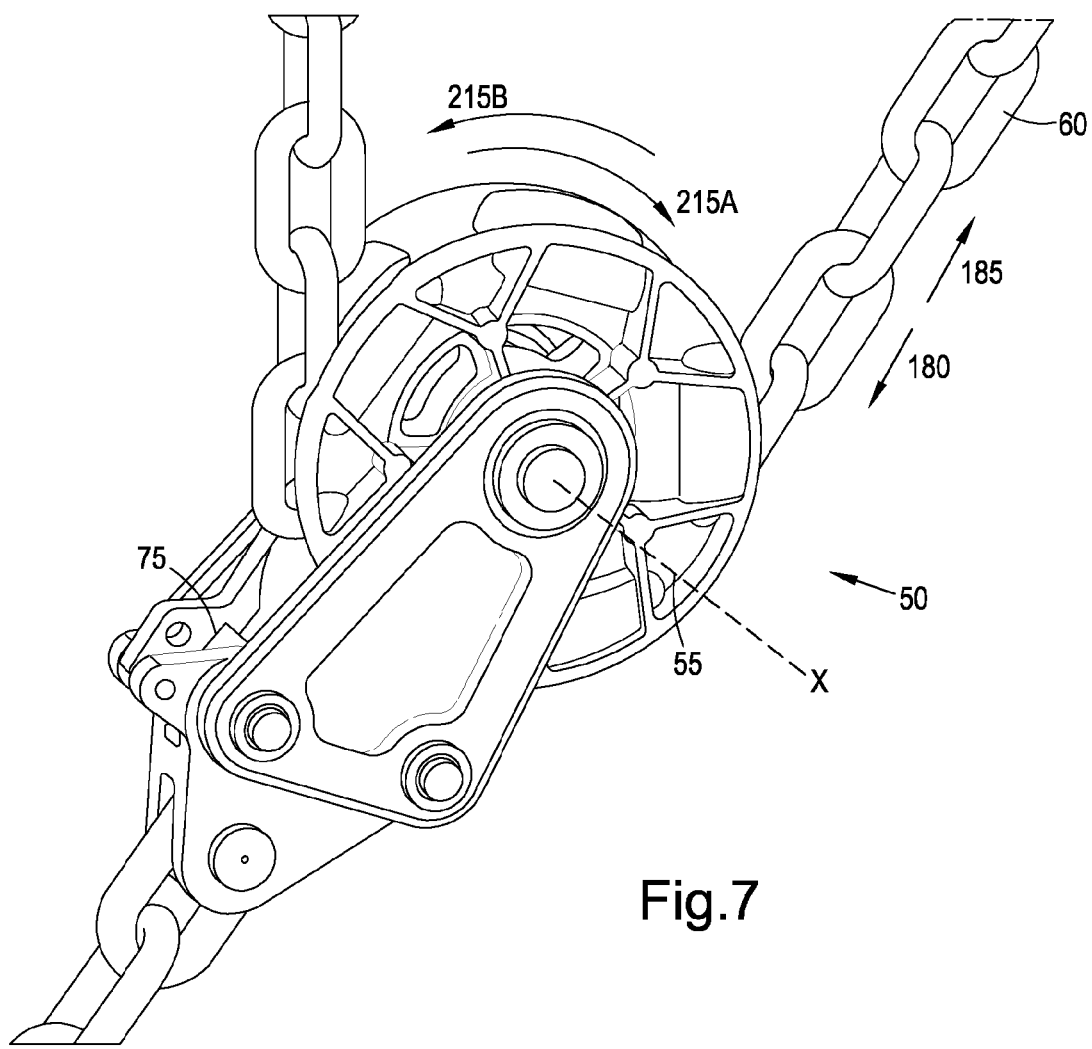
FIG. 7 a further perspective view of the apparatus of FIG. 2.

Referring now to FIG. 7, there is shown a further perspective view of the apparatus of FIG. 2. FIG. 7 shows the apparatus 50 in use.

The apparatus 50 is adapted to allow the first mooring line 60 to be pulled through the apparatus 50 in a first direction shown by arrow 180. The apparatus 50 is adapted to inhibit movement of the first mooring line 60 in a direction opposite to the first direction shown by arrow 185. The lock 75 and the lock positioning apparatus 150 are adapted to allow the first mooring line 60 to be pulled through the apparatus 50 in the first direction 180. The lock 75 and the lock positioning apparatus 150 are adapted to inhibit movement of the first mooring line 60 in a direction 185 opposite to the first direction 180. As such, it can be seen that the apparatus 50 is adapted to permit unidirectional movement of the mooring line through the apparatus 50.

The lock 75 is movable between the first and second positions by the mooring line 60 as the mooring line 60 is pulled through the apparatus 50. The lock 75 is movable between the first and second positions by the mooring line 60 as a mooring line 60 is pulled around the guide portion 55. The lock 75 is movable between the first and second positions by the mooring line 60 while the mooring line 60 is in contact with the guide portion 55, and the guide portion 55 rotates around the axis X.

It can be seen that movement of the first mooring line 60 through the apparatus 50 in a first direction 180 urges rotation of the guide portion 55 in a first rotational direction 215A. Movement of the first mooring line through the apparatus in a second direction 185 urges rotation of the guide portion in a second rotational direction 215B.

Referring now to FIG. 8a, there is shown a side view of the apparatus 50 of FIG. 2. In FIG. 8a, the lock 75 is shown in a disengaged position. In the disengaged position, a mooring line engaging surface of the lock 205 is pivoted in a direction away from the guide portion 55.

In the exemplary embodiment of FIG. 8a, the lock 75 has been transitioned to the disengaged position by movement of a portion of the mooring chain 61. In use, the angle α of the mooring chain 61 relative to the guide portion 55 is changed, such that the portion of the mooring chain 61 acts upon the lock 75 and urges the lock 75 towards the disengaged position. The angle α is increased to urge the lock 75 towards the disengaged position.

The lock 75 is shown retained in the disengaged position by a locking pin 82.

Figure 8B:
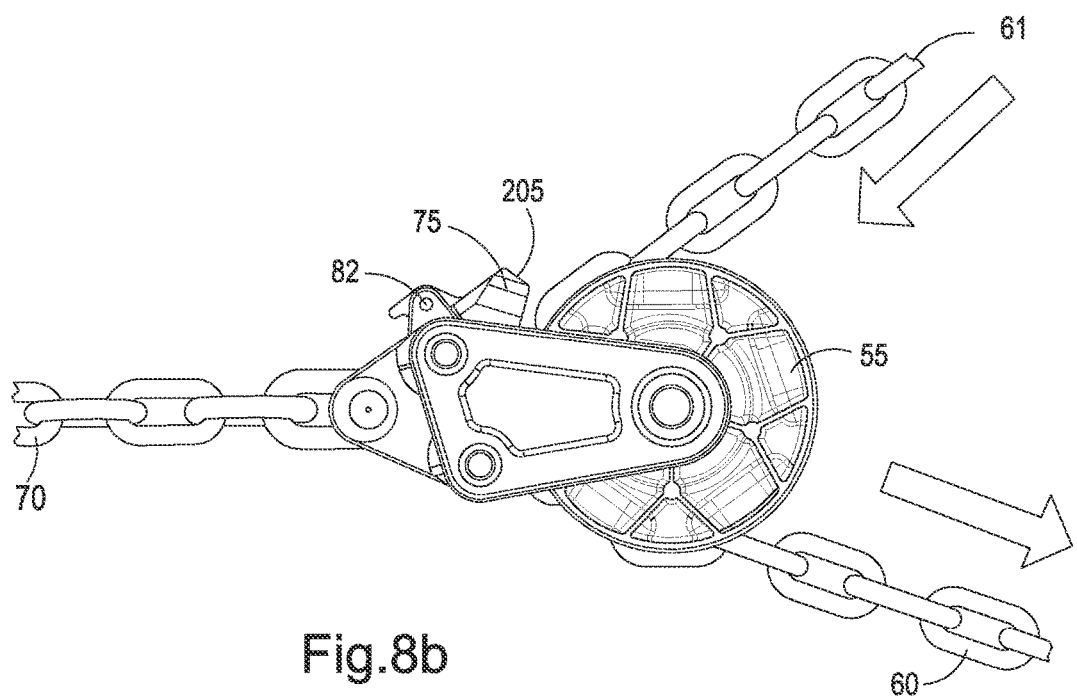
FIG. 8b a further side view of the apparatus of FIG. 2.

Subsequently, and as shown in FIG. 8b, in use the angle α of the mooring chain 61 relative to the guide portion 55 may be reduced, allowing the chain 61 to freely move through the apparatus 50. As such, tension in the mooring line 60, 70 may be reduced.

The lock 75 is shown retained in the disengaged position by a locking pin 82.

Subsequently, and as shown in FIG. 8b, in use the angle • of the mooring chain 61 relative to the guide portion 55 may be reduced, allowing the chain 61 to freely move through the apparatus 50. As such, tension in the mooring line 60, 70 may be reduced.

Figure 9:
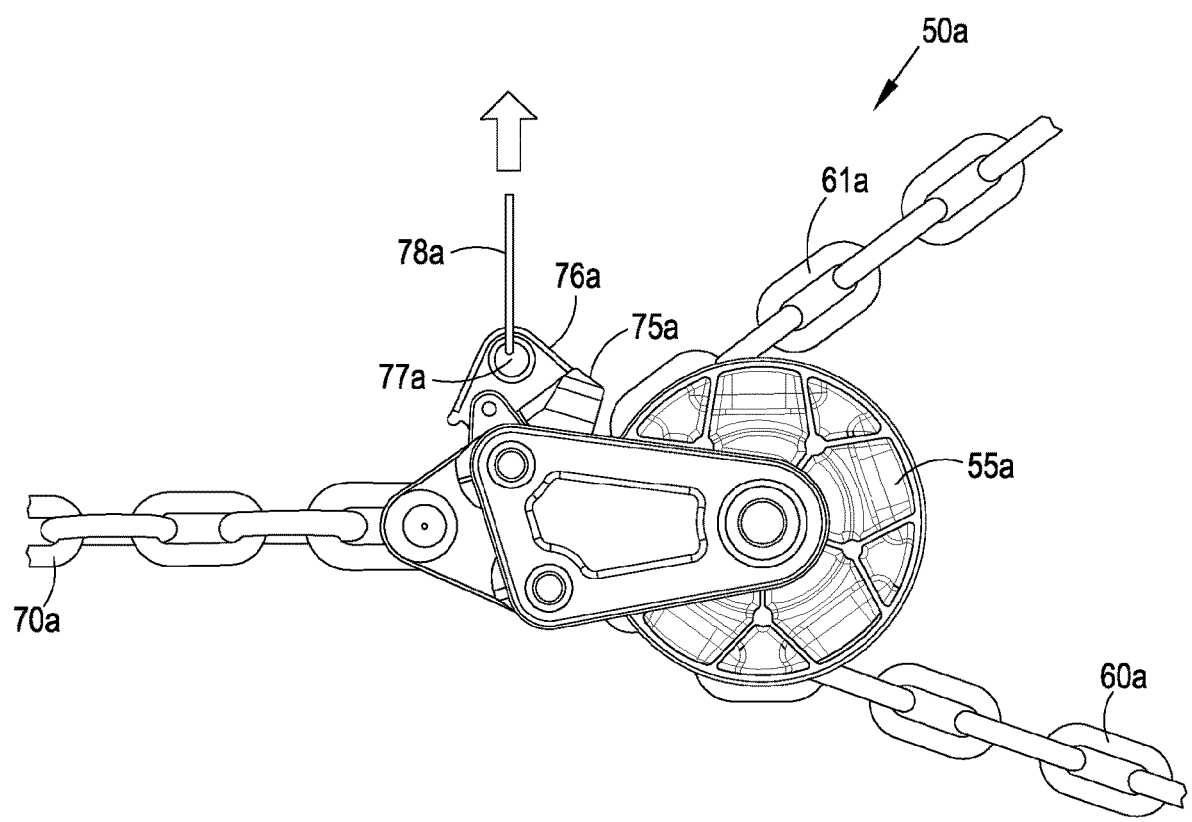
FIG. 9 a side view of a further embodiment of the present invention.

FIG. 9 shows a side view of a further embodiment of the present invention, generally denoted 50a. This embodiment differs from that of the embodiment shown in FIGS. 8a and 8b by a further arrangement 76a affixed to the lock 75a. In the embodiment of FIG. 9, the further arrangement 76a is a padeye, the padeye being suitable for connection to a wire 78a or the like. One will appreciate that in other embodiments encompassing the inventive concept of the present invention, the further arrangement 76a may be a hook, a fastener or any other component or apparatus suitable for connection to a wire, a rope, a chain or the like.

In the embodiment shown in FIG. 9, an opening 77a in the further arrangement 76a is positioned such that, in use, a pulling force applied in a direction away from the apparatus 50a, in an generally upwards direction as shown in FIG. 9, causes the lock 75a to pivot from an engaged position to a disengaged position. As such, the apparatus 50a may be operated remotely by, for example, a pulling force being applied to the wire 78a. The pulling force may be applied by a floatation device, such as a buoy or the like. Advantageously, such an arrangement may dispense with a requirement to insert a locking pin to retain the lock 75a in the disengaged position. Advantageously, such an arrangement does not require an angle of incidence of the mooring line 61a to be changed to transition the lock between the engaged and disengaged position.

Figure 10:
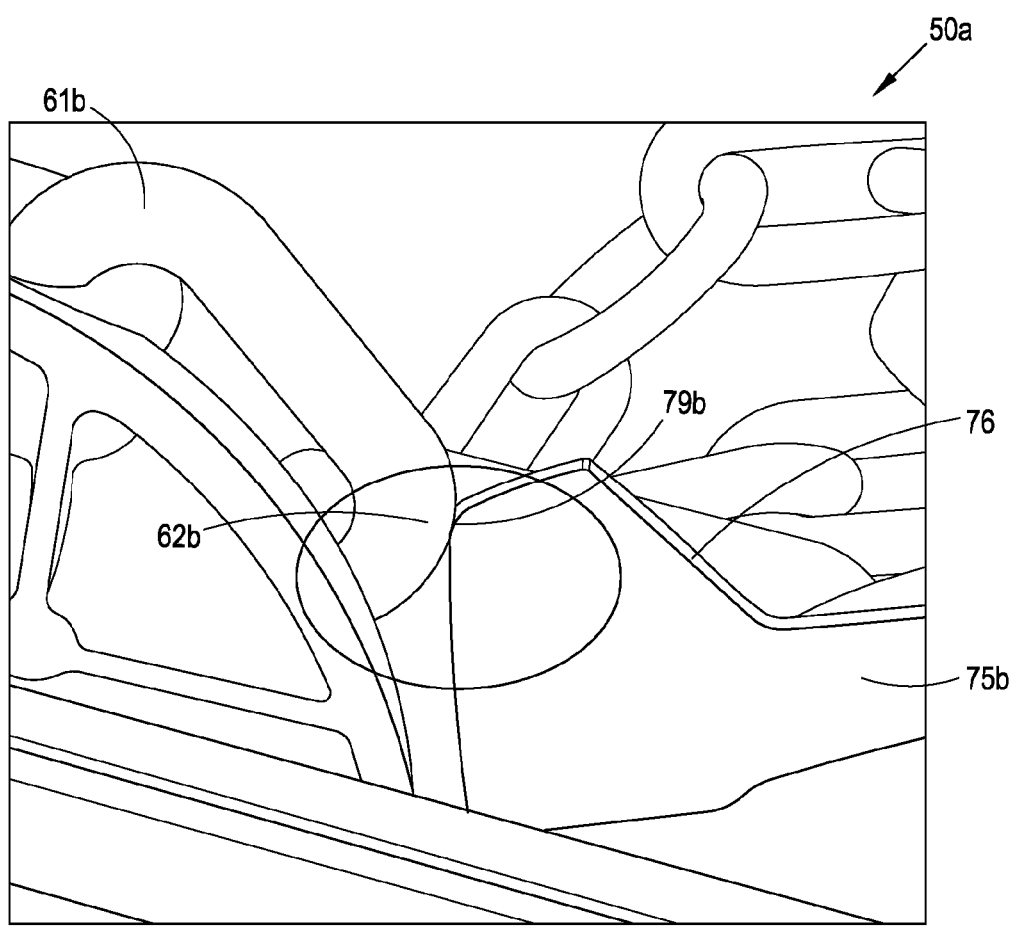
FIG. 10 a view of an exemplary embodiment of the present invention.

Referring now to FIG. 10, there is shown a view of a portion of an exemplary embodiment of the present invention, generally denoted 50b. FIG. 10 shows a chain 61b and a chain stopper 76b. The chain stopper 76b is arranged at a "bite point". The "bite point" is an arrangement wherein a corner 79b of the lock 75b is located against a curved portion 62b of a link in the chain 61b. In the event of a change of direction of a chain through the apparatus, the lock may jam against a side of the chain link, potentially damaging the chain and/or the lock.

Figure 11A:
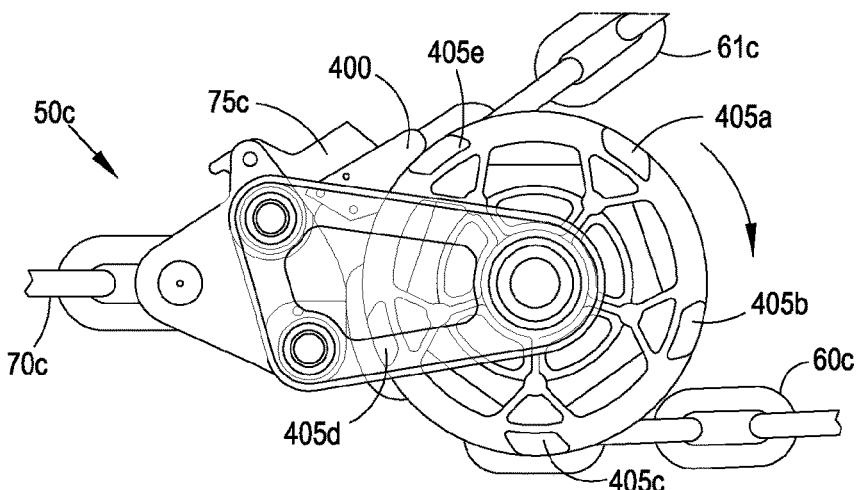
FIG. 11a a side view of a further embodiment of the present invention.

FIG. 11a shows a further embodiment of the present invention, generally denoted 50c. Chain wheel 55c comprises five circumferentially arranged cams 405a, 405b, 405c, 405d, 405e. One will appreciate that there may be fewer cams, such three or four cams, or a greater quantity of cams, such as six or more. The quantity of cams may be selected based on dimensions of the chain and/or dimensions of the chain wheel.

Figure 11B:
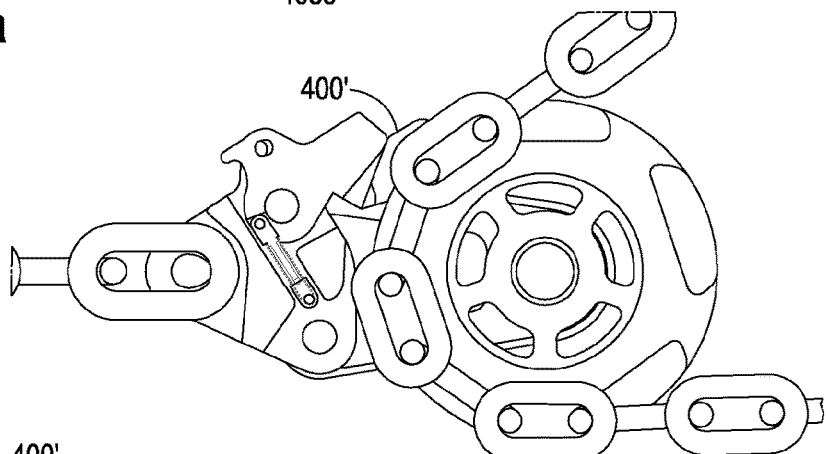
Figure 11C:
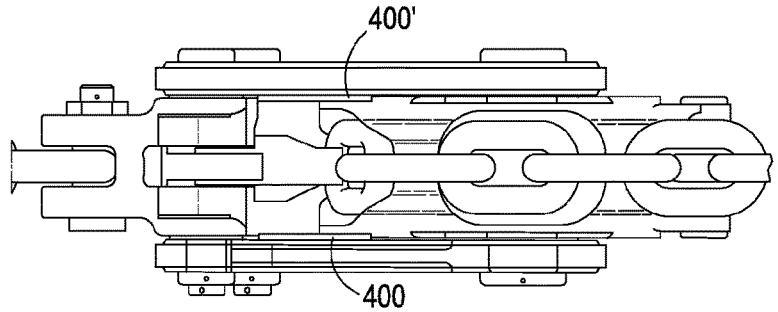
Figure 11D:
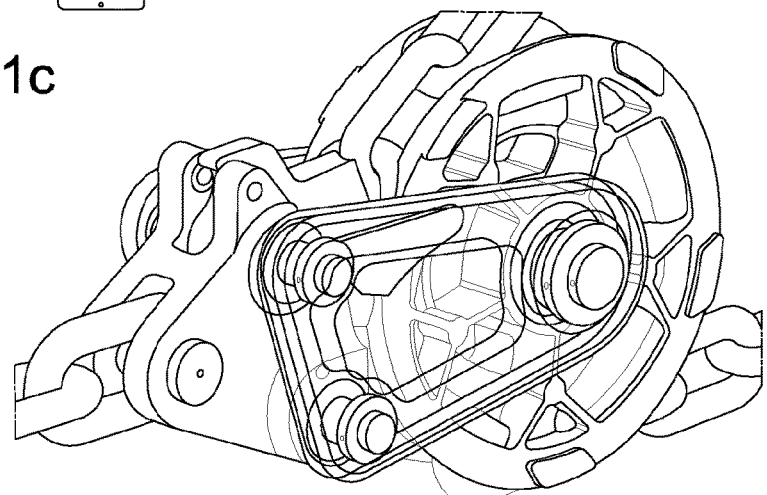

Chain stopper 75c comprises a pair of extension elements 400, 400'. In use, the extension elements 400, 400' are arranged to interact with the cams 405a, 405b, 405c, 405d, 405e during rotation of the chain wheel 55c. In use, as the chain wheel 55c rotates in a direction shown by the arrow in FIG. 11a, each cam 405a, 405b, 405c, 405d, 405e sequentially interacts with the extension elements 400, 400'. In use, as the chain wheel 55c rotates, each cam 405a, 405b, 405c, 405d, 405e nudges the extension elements 400, 400' from a first position to a second position. The transition of the extension elements 400, 400' from the first position to the second position causes the chain stopper 75 to transition from the engaged position to the disengaged position. FIG. 11b shows the chain stopper 76c held in the disengaged position by the extension elements 400, 400'. As such, occurrence of the "bite point" is avoided. That is, the effect of the cams 405a, 405b, 405c, 405d, 405e on the chain wheel 55c interacting with the extension elements 400, 400' attached to the chain stopper 76c is to hold the chain stopper 75c in a disengaged position until the chain wheel 55c has rotated approximately 10 degrees past a point where a restrained chain link is locked by the chain stopper 76c. This means that the chain link to be restrained is well clear of the chain stopper 76c at a point where the extension elements 400, 400' slip off the cam 405a, 405b, 405c, 405d, 405e on the chain wheel 55c and allows the chain stopper 76c to drop. The extension elements 400, 400' in no way hinder the chain wheel 55c as it is reversed to sit the chain link into the chain stopper 76c once the chain stopper 76c has dropped. FIG. 11c provides a top view of the embodiment of FIG. 11a. FIG. 11d provides a perspective view of the embodiment of FIG. 11a with the lock in the engaged position. The extension elements 400, 400' may be an integral part of the chain stopper 76c, or they may be affixed to the chain stopper 76c.

Referring now to FIG. 12, there is shown a system, generally denoted 250, for tensioning a mooring line 60, 70 comprising the mooring apparatus 50 of FIG. 2. The system comprises a first mooring line 60. The system 250 comprises a second mooring line 70. The system 250 comprise a floating structure 255, which one will appreciate may be an offshore structure, a floating platform, a vessel or the like.

A portion 260 of the first mooring line 60 has been threaded through the apparatus 50. A first portion 265 of the first mooring line 60 is connected to the floating structure 255. The system comprises a floating vessel 270. The system comprises a winch 275. The winch 275 is located on or in the floating vessel 270.

The second portion 260 of the first mooring line 60 is adapted to be connected to the winch 275. The winch 275 is adapted to set, adjust or increase a tension in the first mooring line 60.

A first portion of the second mooring line 70 is connected to at least a portion of the apparatus 50. The first portion of the second mooring line 70 is connected to the arrangement 90. The first portion of the second mooring line may be releasably connected to the arrangement 90.

The system 250 comprises an anchor 280. One will appreciate that in other embodiments encompassing the inventive concept of the present invention, the anchor may be a pile, such as a suction pile or the like, or the anchor may be a subsea formation. A second portion of the second mooring line 70 is connected to the anchor 280 or to an anchoring point.

It will be appreciated that in other embodiments encompassing the inventive concept of the present invention, the mooring apparatus may be used, or dispositioned, in a different or an opposite orientation. That is, in use, a first portion of the second mooring line may be connected to an anchor, a pile (such as a suction pile), a subsea structure, or the like, and a second portion of the second mooring line may be threaded through the apparatus 50 and, for example, connected to the winch 275. In this embodiment, the arrangement may be detachably connected to the first mooring line, and the first mooring line may be connected to a floating structure or vessel hull, Referring now to FIG. 13, there is shown a system, generally denoted 300. FIG. 13 shows the system 300 after the mooring line 360, 370 has been tensioned to a mooring tension.

A portion 365 of the first mooring line 360 has been threaded through the apparatus 50. The system 300 comprises a buoyancy module 380. The portion 365 of the first mooring line 360 is configured to be connected to the buoyancy module 380. Beneficially, the buoyancy module 380 holds an excess portion of the first mooring line 360 away from the apparatus 50.

It will be appreciated that the embodiments of the present invention herebefore described are given by way of example only and are not meant to limit the scope of thereof in any way.

It will be appreciated that one or more embodiments of the present invention may provide one or more benefits over the prior art.

The invention claimed is:

1. A mooring apparatus comprising:
   a guide portion for guiding a portion of a first mooring line,
   an arrangement for connecting or coupling the apparatus to a second mooring line, and
   a lock, wherein
   the guide portion is moveably connected to the arrangement, and
   the lock is connected to, attached to or provided on the arrangement,
   wherein, when at least a portion of the first mooring line is a chain, in an engaged position the lock restrains and/or abuts at least one link of the chain and the at least one link of the chain is in contact with the guide portion.

2. The mooring apparatus as claimed in claim 1, wherein the guide portion is a chain wheel which is rotatable relative to the arrangement, such as around a central axis of the guide portion.

3. The mooring apparatus as claimed in claim 1, wherein the lock is disposed between the second mooring line and the guide portion and/or between the arrangement and the guide portion.

4. The mooring apparatus as claimed in claim 1, wherein, in use, at least a portion of the first mooring line is disposed, locked and/or secured between the lock and the guide portion and/or the lock is adapted to secure or lock the first mooring line between the lock and an outer peripheral/circumferential portion of guide portion.

5. The mooring apparatus as claimed in claim 1, wherein the lock is hingedly or pivotably attached or connected to the arrangement.

6. The mooring apparatus as claimed in claim 1, further comprising an arrangement for biasing the lock to the engaged position, and optionally wherein the arrangement for biasing the lock is hingedly or pivotably connected to the arrangement and/or the lock.

7. The mooring apparatus as claimed in claim 1, wherein the guide portion comprises a plurality of circumferentially arranged cams.

8. The mooring apparatus as claimed in claim 1, wherein the arrangement comprises at least one stop-block, ridge, flange or protrusion to limit a degree of movement of the lock.

9. The mooring apparatus as claimed in claim 1, wherein in the engaged position, the lock restrains and/or abuts at least a portion of the first mooring line, and wherein the at least a portion of the first mooring line is in contact with the guide portion.

10. The mooring apparatus as claimed in claim 1, wherein in the engaged position, the lock restrains and/or abuts the guide portion.

11. The mooring apparatus as claimed in claim 1, wherein the apparatus is adapted to allow the first mooring line to be pulled through, threaded through, or wound around, the apparatus in a first direction, and/or the apparatus is adapted to inhibit movement of the first mooring line in a direction opposite to the first direction.

12. The mooring apparatus as claimed in claim 1, wherein the apparatus is suitable for offshore and/or subsea operations and can be submerged in use.

13. A system for tensioning a mooring line, the system comprising a mooring apparatus according to claim 1 and a first mooring line and/or a second mooring line.

14. A method of tensioning a mooring line, wherein the method comprises:
   providing a system for tensioning a mooring line according to claim 13, and the method further comprises:
   applying a pulling force to a first portion of the mooring line in a direction away from the apparatus.

15. A method for releasing tension in a mooring line, the method comprising:
   providing a system for tensioning a mooring line according to claim 13, the method further comprising:
   applying a pulling force to a first portion of the mooring line in a direction away from the apparatus;
   retaining the lock in a disengaged position; and
   reducing and/or removing the pulling force.

16. A mooring apparatus comprising:
   a guide portion for guiding a portion of a first mooring line;
   an arrangement for connecting or coupling the apparatus to a second mooring line; and
   a lock, wherein
   the guide portion is moveably connected to the arrangement, and
   the lock is connected to, attached to or provided on the arrangement, wherein the guide portion comprises a plurality of circumferentially arranged cams, and
   wherein the lock comprises at least one finger or extension element and wherein, in use, the at least one finger or extension element is arranged to interact with the plurality of cams during rotation of the guide portion.

17. The mooring apparatus as claimed in claim 16, wherein, in use, as the guide portion moves or rotates, each cam of the plurality of cams is adapted to move the at least one finger or extension element from a first position to a second position.

18. The mooring apparatus as claimed in claim 17, wherein a transition of the at least one finger or extension element from the first position to the second position causes the lock to transition from an engaged position to a disengaged position.

19. The mooring apparatus as claimed in claim 18, wherein, in use, the cams are adapted to hold the lock in the disengaged position until the guide portion has rotated beyond a point where a restrained portion of the mooring line is or becomes jammed by the lock.

* * * * *